May 19, 1970 R. M. ULRICH 3,512,589

EARTH MOVING APPARATUS

Filed Feb. 16, 1967 7 Sheets-Sheet 1

INVENTOR
RAYMOND M. ULRICH

BY Brown, Jackson, Boettcher & Dienner
ATTORNEYS

EARTH MOVING APPARATUS

Filed Feb. 16, 1967

INVENTOR
RAYMOND M. ULRICH
BY Brown, Jackson, Boettcher & Dienner
ATTORNEYS

EARTH MOVING APPARATUS

Filed Feb. 16, 1967 7 Sheets-Sheet 3

INVENTOR
RAYMOND M. ULRICH

BY Brown, Jackson, Boettcher & Dienner
ATTORNEYS

May 19, 1970 R. M. ULRICH 3,512,589

EARTH MOVING APPARATUS

Filed Feb. 16, 1967 7 Sheets-Sheet 4

INVENTOR
RAYMOND M. ULRICH

BY Brown, Jackson, Boettcher & Dienner

ATTORNEYS

EARTH MOVING APPARATUS

Filed Feb. 16, 1967

INVENTOR
RAYMOND M. ULRICH
BY Brown, Jackson, Boettcher & Dienner
ATTORNEYS

May 19, 1970 R. M. ULRICH 3,512,589

EARTH MOVING APPARATUS

Filed Feb. 16, 1967 7 Sheets-Sheet 6

INVENTOR
RAYMOND M. ULRICH

BY Brown, Jackson, Boettcher & Dienner

ATTORNEYS

INVENTOR
RAYMOND M. ULRICH
BY Brown, Jackson, Boettcher & Dienner
ATTORNEYS

United States Patent Office 3,512,589
Patented May 19, 1970

3,512,589
EARTH MOVING APPARATUS
Raymond M. Ulrich, Roanoke, Ill., assignor to Ulrich Foundation, Inc., Roanoke, Ill., a corporation of Delaware
Filed Feb. 16, 1967, Ser. No. 616,560
Int. Cl. E02f 3/76
U.S. Cl. 172—786 12 Claims

ABSTRACT OF THE DISCLOSURE

This invention relates to earth moving and/or grading apparatus and particularly to a new and novel construction of moldboard which includes a sectionalized blade and structure by which the same may be set to assume any one of a number of possible working positions.

A principal object of the invention is to provide an improved moldboard especially adapted for mounting on a conventional motor grader having the advantages and utility of moldboard structures conventionally provided such vehicles and at the same time providing additional advantages by way of increased utility and improved performance so that the vehicle may be used more efficiently and also to accomplish jobs previously beyond the capability of a motor grader.

Although particularly adapted for a motor grader, the invention may also be mounted on the frame of earth and/or material handling vehicles generally, which vehicles may be of the self-propelled type, such as motor trucks, dozers and tractors, as well as motor graders. The invention may be also mounted on the frame of a vehicle or rig which is attached to a second vehicle to be pulled, pushed or to be supported thereby on a boom, as in cantilever fashion.

In brief, the invention embraces a moldboard comprising a sectionalized blade in which the blade is mounted as a unit to be rotatable about a generally vertical axis and the individual blade sections are adjacently hinged to permit a forward and reverse veeing of the blade sections to different angular relations independently of, although in cooperation with, the angle at which the blade is adjusted about said first or generally vertical axis. In addition the blade is so mounted that it may be tilted relative to said first axis to adjust the vertical pitch of the blade sections. The blade is also elevatable or lowerable as a unit and additionally either end of the blade may be raised and/or lowered relative to its other end so as to accommodate longitudinal tilting of the blade to either the left or the right of the vehicle on which it is mounted and the blade may also be longitudinally displaced relative to said first axis and/or the blade may be longitudinally displaced with lateral displacement of said first axis relative to the frame on which the structure is supported.

Thus in useful forms of the invention the moldboard is suspended beneath an overhead circle which is attached to the vehicle or other frame so that it may be rotated about a central axis considered as vertical when the supporting frame is in a substantially horizontal plane. The circle is, however, mounted on the frame so that it, and thereby said central axis and also the blade, may be set at a transverse angle to the direction in which the vehicle travels and so that the blade may be also moved bodily in said transverse direction. In accordance with the invention such circle or attaching member has a pair of depending arms to which are connected a pair of slides which in turn are respectfully keyed to one of two hinged blade sections comprising the moldboard. Said connection affords pivotal movement in at least two planes disposed it right angles to each other, one being disposed parallel to the axis about which the blade sections hinge and the other at right angles thereto. In one form of the invention a connector is utilized comprising a generally U- or C-shaped member having a pair of parallel spaced legs, the ends of which are pivotally connected to the slides for pivotal movement about spaced parallel vertical axes and to which legs the depending arms of the overhead circle are also pivotally connected but for movement about coinciding horizontal axes. In another form of the invention separate connectors are employed in place of the single C-shaped member. In either arrangement between the connectors and/or legs of the C-frame and the overhead circle are extensible means preferably in the form of hydraulic devices, including a piston and cooperating cylinder which may be operated to effectively tilt the connectors and/or C-frame and thereby the moldboard about the mentioned horizontal pivotal connections of the slides with said connectors. The invention also utilizes extensible means such as the described hydraulic devices which effect hinging of the blade sections about the intermediate pivot member. In one form of the invention these hydraulic members are connected between the corners of the generally C-shaped connector and respective blade sections between the slides and the intermediate pivot member such that by extension thereof the pivot member may be moved in a forward or in a reverse direction, the mentioned slides facilitating the veeing of the two blade sections about the pivot member in response to said extension and contraction of the extensible means. In an alternative construction a single hydraulic device is utilized having its piston connected to one blade section between the pivot member and the slide thereon and its cylinder connected to the other blade section between the pivot member and its slide wherefore extension and contraction of the hydraulic device has a similar effect in displacing the pivot member forwardly and rearwardly to accomplish the required veeing of the moldboard blade section. In still another form of the invention a single hydraulic device has one element connected to the pivot member and its other element pivotally supported by the two hinged blade sections such that the hydraulic motor may effect a push-pull on the pivot member to effect the veeing of the blade. In accordance with the invention, mechanical arrangements may be also employed to effect said veeing of the blade sections.

In the first described embodiment of the invention, one of the hydraulic devices may be operated so that it pushes outwardly while the other is pulling inwardly on its respective blade section, with the result that the moldboard can be moved as a unit laterally of the circle, that is in directions considered longitudinally of the moldboard itself. In alternate embodiments, a second hydraulic device can be located along one of the blade sections with its piston, for example, pivotally connected to the rear side of one blade section and its cylinder pivotally connected to the slide whereby the push-pull action of the piston operating in its cylinder can be utilized to similarly longitudinally displace the moldboard blade sections in their respective mounting slides. An advantage of the alternate construction is the more compact arrangement which is permitted by reason that the two hydraulic devices are located rearwardly of and alongside the blade section of the moldboard in relatively close compact relation thereto.

Thus a feature of the invention is the large variety of possible settings of the moldboard and its blade sections which the described adjustment of the moldboard and its blade sections permit.

A further feature is the ease and convenience with which an operator is able to shift from one setting to another.

Thus the invention makes it possible through appropriate adjustment of the blade and its hinge sections to perform in one movement of the vehicle numerous grading jobs that previously required two or more operations of the vehicle, each with a different setting of its blade. Consequently, it is a feature of the invention that not only can the time required to complete the job in many instances be considerably shortened, but also the total operation can be accomplished in a more satisfactory and in efficient manner. In addition, the vehicle is also now useful to perform many operations previously not considered practicable.

As examples of the increased utility of the invention, the hinge blade sections can be aligned and the moldboard disposed at a specific angle as in a conventional grading operation. By reason that the moldboard can be tilted as a unit about a horizontal axis disposed at right angles to the axes about which its blade sections hinge, the pitch or attack of the blade in a grading operation can be varied without raising or lowering the blade itself. Thus the invention provides a simple arrangement for varying the depth of the cut and which can be accomplished as the machine is moving so as to permit a gradually angular increasing or inclined grading if that is required.

By reason that the moldboard can be rotated about a horizontal axis and its blade sections be hinged in either a forwardly or in a reverse direction, considerable variation in the width of the cut is also possible. For example, in one embodiment of the invention employing a fourteen foot blade it has been possible to cut a swath also only twenty-eight inches wide. Moreover by appropriately veeing the blade sections and rotating the moldboard about the axis of the circle, it is also possible to position one of the two blades to cut or level as in a grading operation and the other to control the area of spillage.

The invention is particularly useful in windrowing, ditching, leveling or to produce a crowned surface. If the two blade sections of the moldboard are veed either forwardly or in reverse, the moldboard can be tilted about the mentioned horizontal axis to permit a V cut in which either the center or the two edges of the moldboard are raised, this being dependent on the direction in which the two blade sections are initially hinged. If the circle is also tilted to raise or lower one end of the moldboard, the grader may be adapted to clean a ditch alongside a roadway. Also, in ditching one blade section can be inclined to cut or clean the ditch and the other blade section set to finish the shoulder, both operations being performed simultaneously.

A particularly important feature of the invention is the novel construction of the moldboard itself which is such that whether the blade sections are aligned in a straight line or are veed forwardly or rearwardly, the moldboard, nevertheless, presents a continuous and uninterrupted surface to the earth or other debris being attacked.

It will be appreciated that in a conventional split blade the hinged ends of the two blade sections meet or are covered when the sections are in a straight line, but gap when the sections are hinged, as when their apex is located in a forward direction for example. However, in accordance with the present invention, this gap is avoided and because the adjacent ends of the two blade sections are hinged to an intermediately disposed pivot member the forward side of which has a concave shape such that in transverse section it corresponds to the curved shape of the individual blade sections and which curved shape of the pivot member is effectively revolved about the axis on which the blade sections are hinged to said pivot member. In addition the adjacent edges of the two blade sections are given a convexed complementing shape such that as the blade sections hinge about the axis of the pivot member, their edges follow the surface of the pivot member and remain in contiguous overlying relation therewith. Consequently in whatever angular relation the two blade sections of the moldboard are disposed, the curved face of the pivot member and faces of the hinged blade sections are such that the moldboard presents a substantially continuous uninterrupted surface.

Further and more specific objects of the invention include the provision of structure which permits the accomplishment of the aforesaid objects and features of the invention in a compact but strong, rugged unit which comprises a minimum number of parts and which is adapted for convenient mounting and dismounting to the frame of a propelling vehicle.

A further specific object of the invention in the arrangement of said parts of the structure and the controls therefore which faciiltate not only smooth operation of the blade sections to accomplish the described adjustments, but also permit the adjustments to be obtained in fine increments and at the will of an operator remotely stationed in the cab of the vehicle.

Still another feature of the invention is the provision and novel construction of indicator means by which the remotely positioned operator is not only free to change, for example, the veeing angle of the hinged blade sections of the moldboard, the pitch thereof and/or longitudinal displacement of the blade, but will be made aware when, for example, the blade is centered beneath the supporting circle, the hinge sections of the moldboard are aligned in a straight line and/or when the pitch of the moldboard is essentially vertical.

Thus it is a further feature of the invention that by use of such indicating means the operator's control over the possible blade adjustments can be greatly facilitated and he is able to alter the adjustments without leaving his position and/or stopping the forward progress of the vehicle.

Many other features, objects and advantages of the invention will be apparent from the following detailed description of preferred embodiments of the invention which will now be described in connection with the accompanying drawings and wherein like parts are identified by like reference numerals.

Therefore referring first to the drawings.

Figures 1, 3, 12:
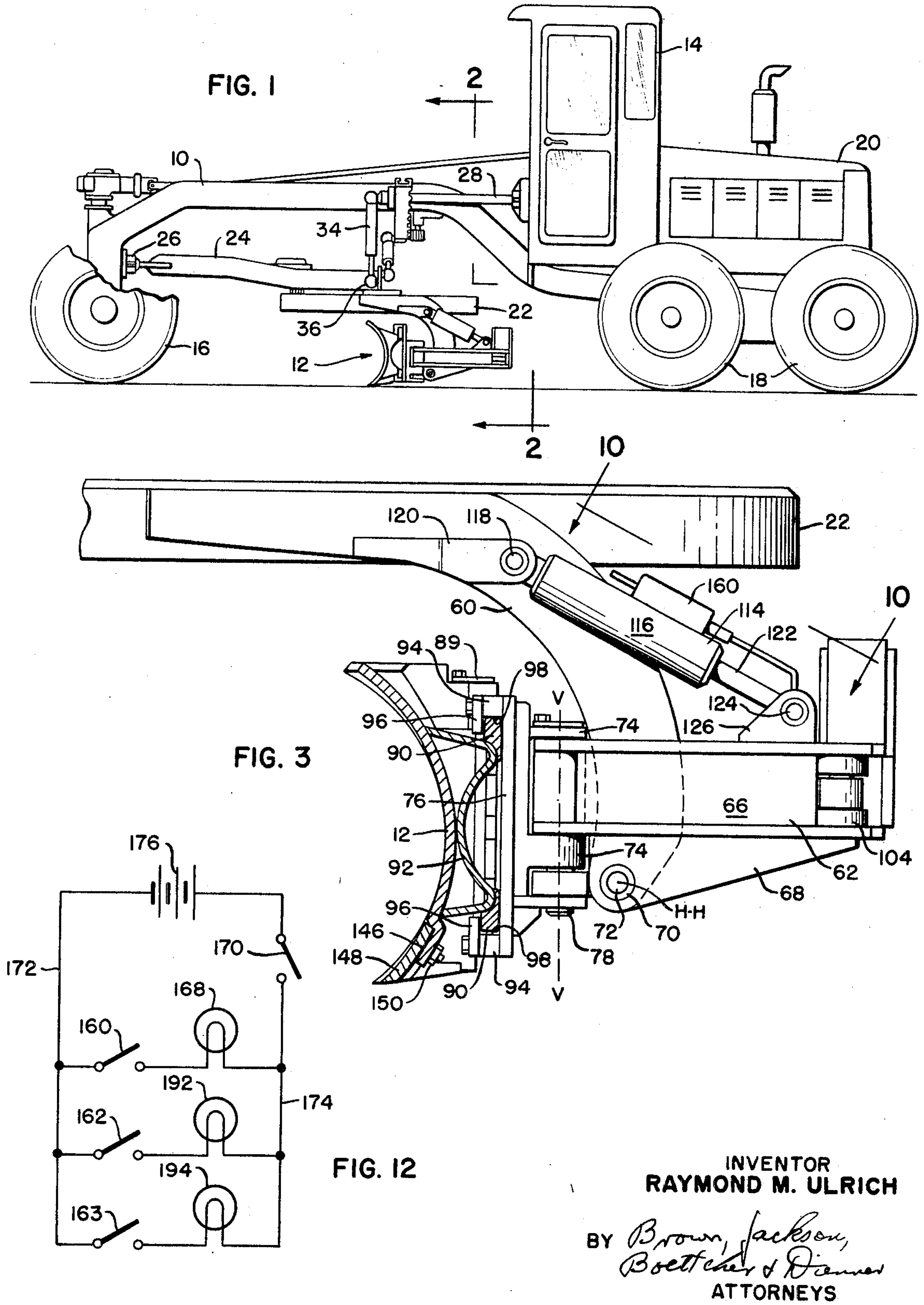
FIG. 1 illustrates one embodiment of the invention shown mounted on a motor grader.
FIG. 3 is a side elevational view taken of the moldboard structure, including the overlying circled frame but detached from the motor grader and is shown partly in section through one of the blade sections to illustrate details in the construction thereof.
Figures 2, 5, 6:
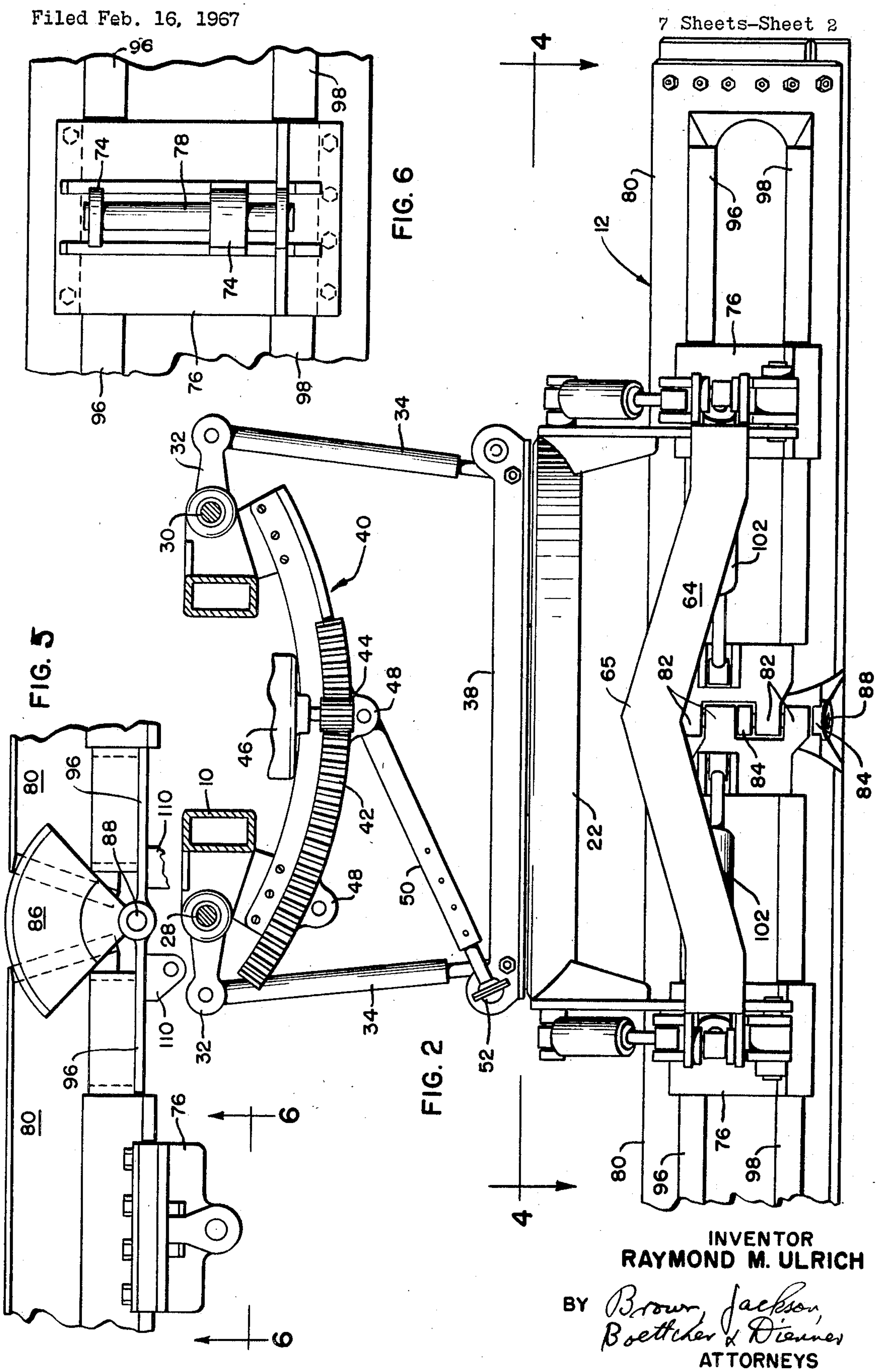
FIG. 2 is a vertical section taken through FIG. 1 along lines 2—2 looking in the direction indicated by the arrows, the view being in somewhat larger scale, and shows the rear side of the illustrated embodiment of the invention and the supporting structure whereby the same is mounted to the frame of the illustrated motor grader and operatively controlled from the cab thereof.
FIG. 5 is a fragmented top plan view of the moldboard blade illustrating the hinged blade sections attached to the intermediate pivot member and detached from the operating and supporting structure therefor.
FIG. 6 is a vertical view taken along lines 6—6 of FIG. 5 and shows details in the construction of the slide member which is slidingly keyed to the rear of the blade sections.
Figures 4, 7, 8, 9:
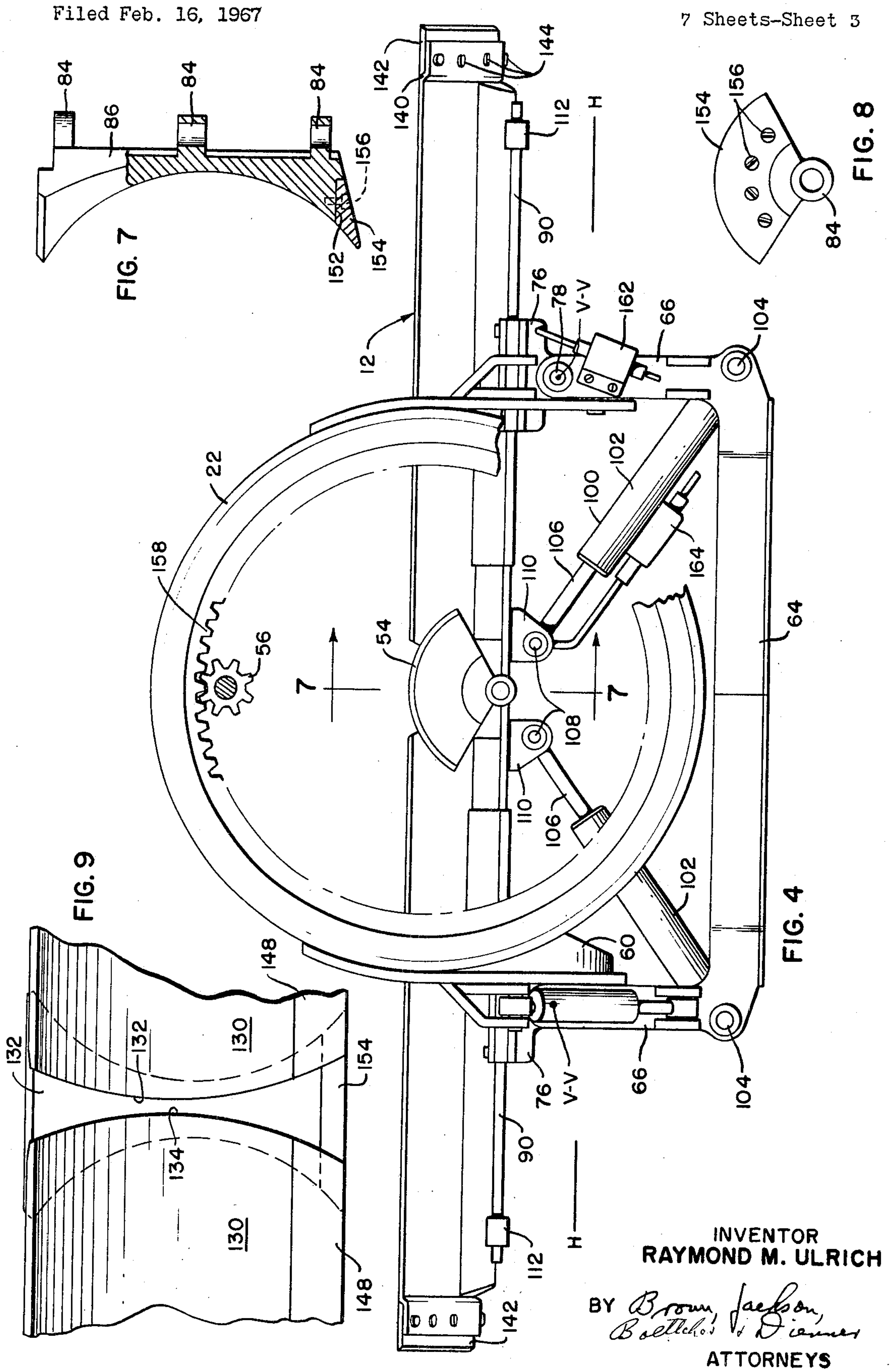
FIG. 4 is a plan view of the illustrated embodiment of the invention detached from the motor grader and considered as taken along lines 4—4 of FIG. 2 looking in the direction indicated by the arrows.
FIG. 7 is a view comprising a vertical section taken through the pivot member or mounting spool and illustrating the same detached and with portions cut away, the view being suggested as taken along lines 7—7 of FIG. 4, looking in the direction indicated by the arrows.
FIG. 8 is a bottom plan view of said pivot member.
FIG. 9 is a fragmented front elevational view of the moldboard and illustrates the convex edges of the two blade sections which continuously follow the concave related surface of the mounting spool or pivot member in the hinging of the blade sections about the axes of said mounting spool.
Figure 15:
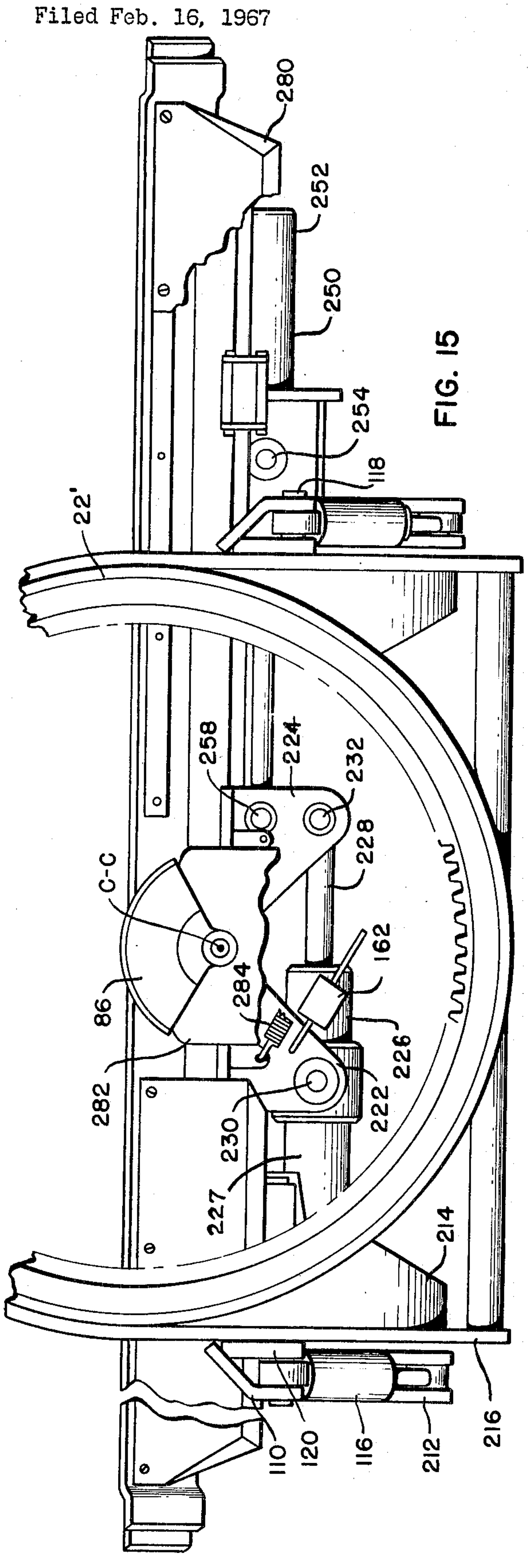
Figures 10, 11:
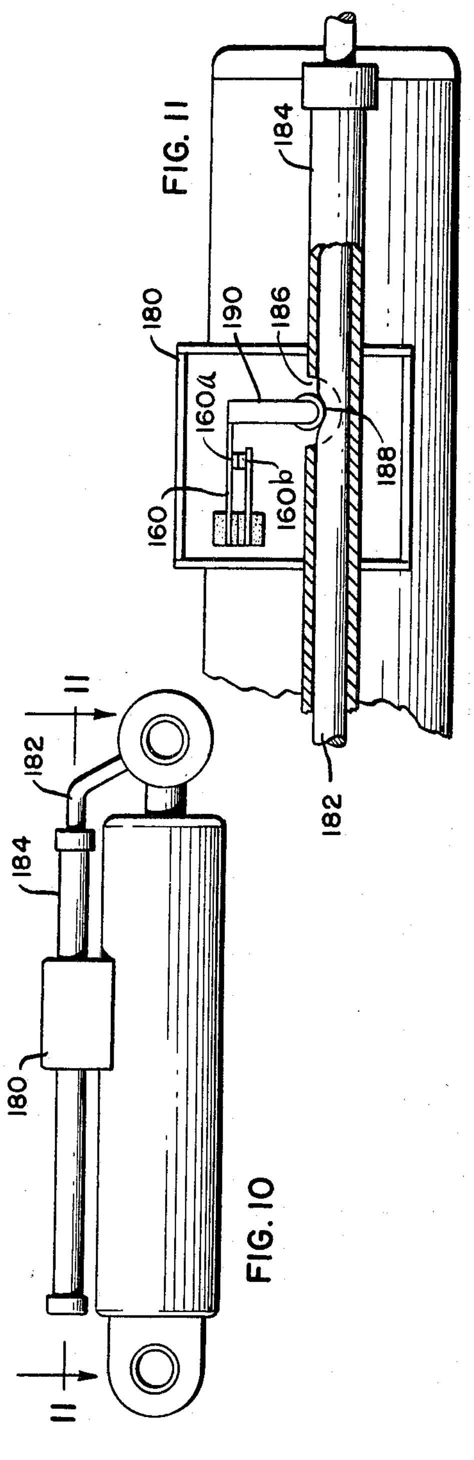
Figures 13, 14, 16:
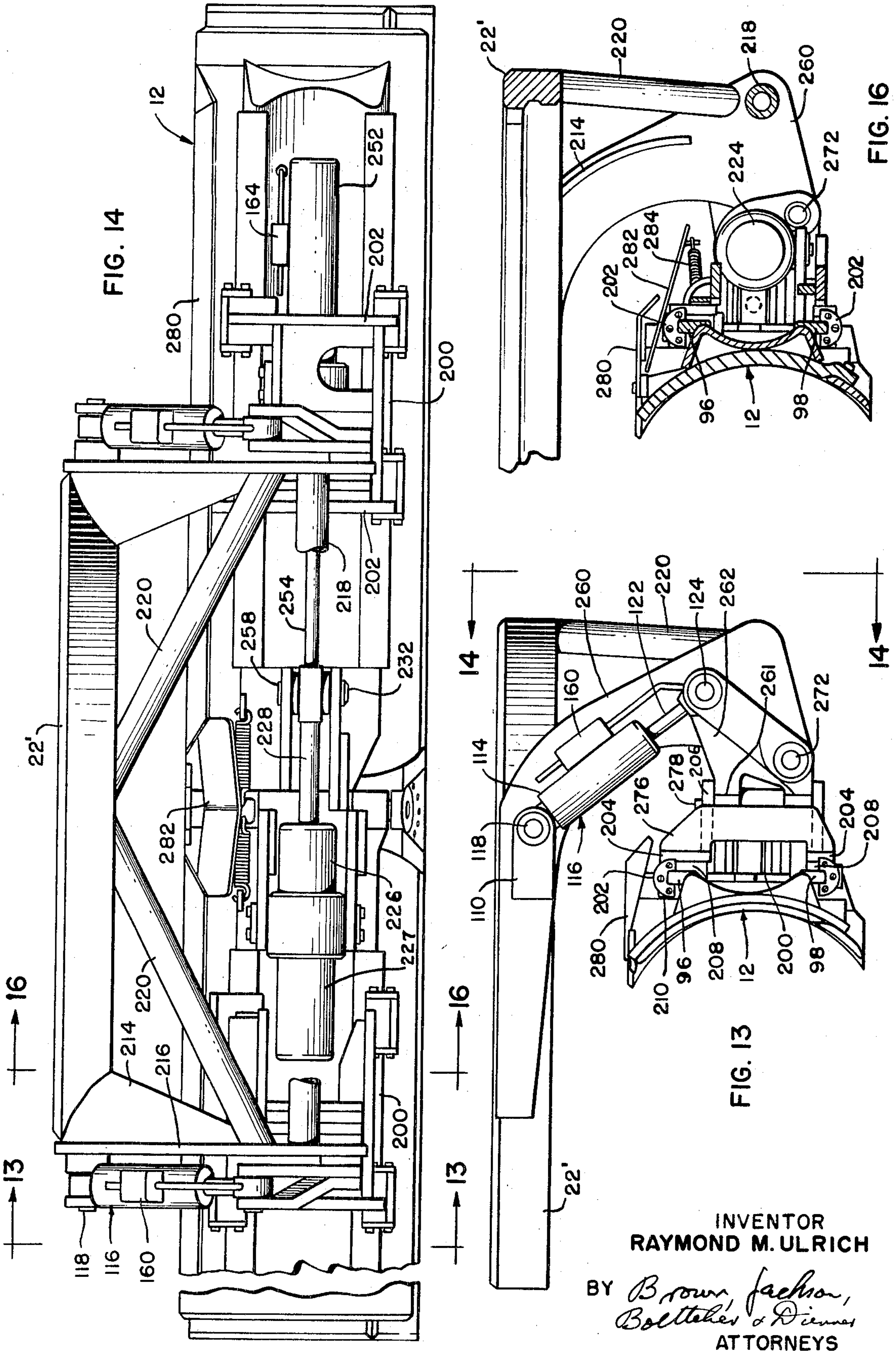
Figure 17:
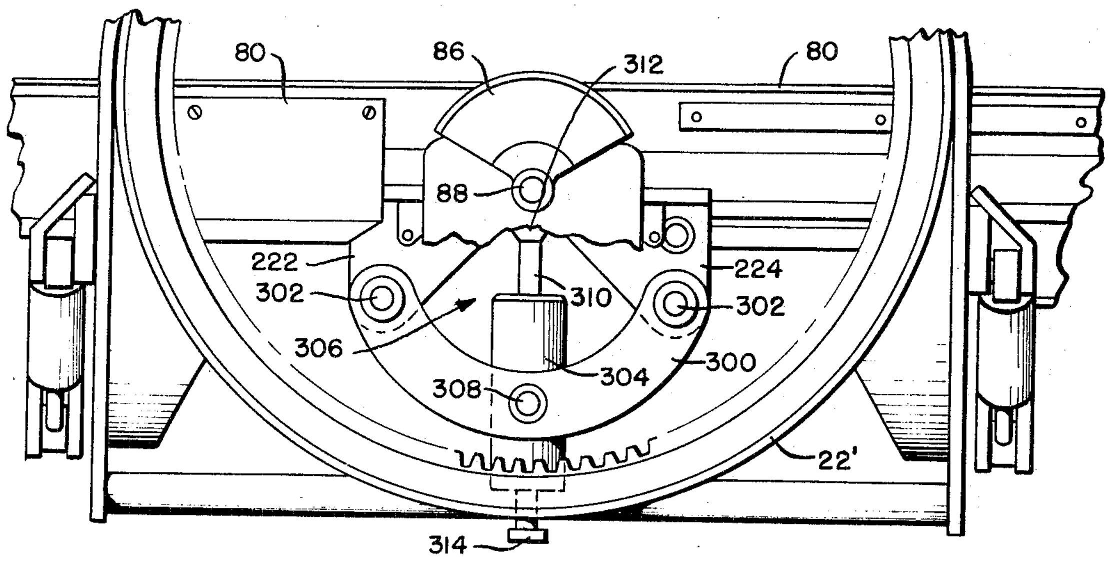
Figure 18:
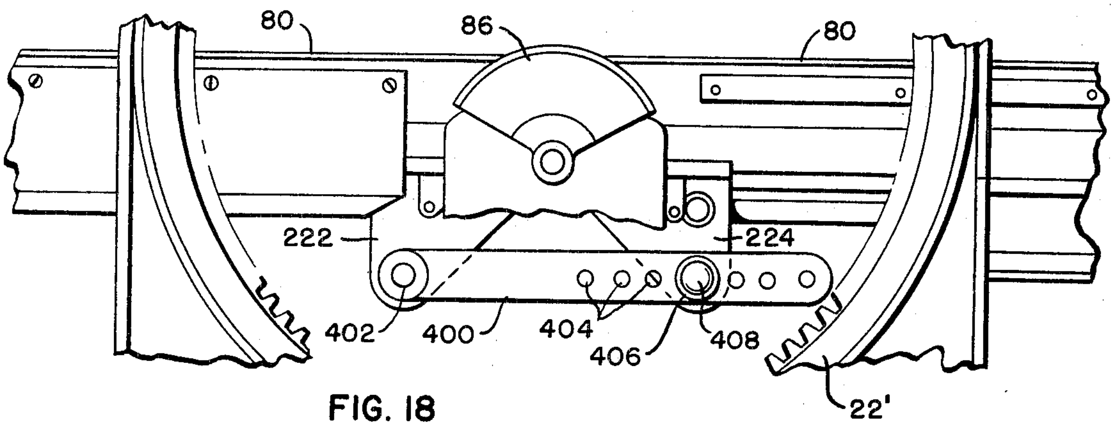
Figure 19:
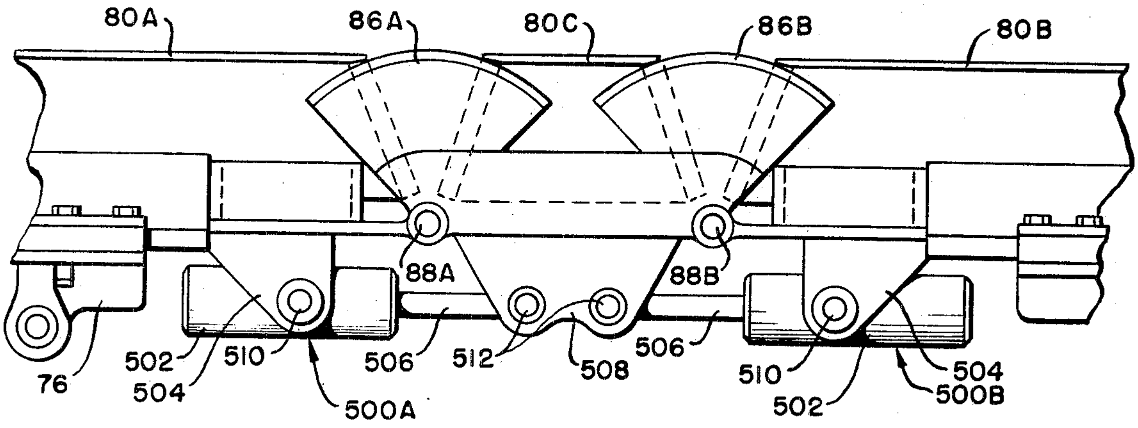

FIG. 10 is an enlarged view taken of one of the hydraulic motors to illustrate the switch and operating means therefor mounted thereon so as to be useful to indicate a controlled position of the blade sections, the same being illustrative of other controls used to indicate other positions of the blade sections, the view being considered as taken along lines 10—10 of FIG. 3 looking in the direction indicated by the arrows;

FIG. 11 is a view taken along lines 11—11 of FIG. 10 looking in the direction indicated by the arrows and shows operating details of the switch;

FIG. 12 is schematic of an electrical circuit including three switches, one of which is illustrated by FIGS. 10 and 11, and including lights or other signaling devices by which the alignment of the mold blade sections, their pitch and centered relation is indicated;

FIG. 13 is a view generally similar to FIG. 3 showing a second and preferred embodiment of the invention, the same being taken along lines 13—13 of FIG. 14 looking in the direction indicated by the arrows;

FIG. 14 is a rear view taken along lines 14—14 of FIG. 13 looking in the direction indicated by the arrows and thus represents a rear view of the second embodiment corresponding generally to the view taken of the first embodiment as illustrated by FIG. 2;

FIG. 15 is a top plan view of said second embodiment and corresponds generally to the view taken of the first embodiment as illustrated by FIG. 4;

FIG. 16 is a view taken along lines 16—16 of FIG. 14 looking in the direction indicated by the arrows and illustrates further details of said second and preferred embodiment of the invention;

FIG. 17 is a top plan view generally similar to FIG. 15 and showing details in the construction of a third embodiment of the invention;

FIG. 18 is a top plan view generally similar to FIG. 15 but showing a fourth embodiment of the invention;

FIG. 19 is a top plan view showing still another embodiment of the invention; and FIGS. 20 through 34 illustrate diagrammatically various adjustments of which the blade sections are possible as afterwards described.

Referring therefore now to the several views wherein like parts are identified by like reference numerals, FIG. 1 illustrates a conventional motor grader having a framed structure indicated generally at 10 to which one embodiment of the invention including moldboard 12 and mounting structure therefor is shown mounted and adapted for operation through controls located in the cab 14 of the motor grader as will be hereinafter more particularly and specifically described with reference to the several remaining figures.

As illustrated, a conventional motor grader comprises the aforementioned frame structure 10 supported at its front end on front steering wheels 16 and at its rear end on rear driving wheels 18. The rear driving wheels are generally, but not necessarily, in tandem pairs. An internal combustion engine 20 operates to drive the rear driving wheels 18 and also the accessories such as the oil pump of the hydraulic control system; and, in the case of a six wheel drive motor grader, this engine also serves to drive the front steering wheels 16. It will, however, be understood that any one of the hereinafter described embodiments of the invention in moldboard and its associated operating structure may be suspended or mounted to not only the supporting frame of a motor grader, as illustrated in FIG. 1, but also may be mounted to beneath the frame or any other vehicle, as for example a motor truck or to a frame permanently or releasably connected to a motor vehicle such as a motor truck, tractor or dozer for dragging there behind or to be pushed forwardly thereof. For example, the moldboard and its associated structure as afterwards described might be supported from a frame corresponding to 10, but supported on front and rear ground engaging wheels and which frame is adapted to be connected in front of or behind a tractor, a heavy duty truck or other self-propelling vehicle. Said structure including moldboard 12 may also be mounted on a projecting boom fastened to a tractor or other propelling vehicle, the forward end of which may or may not be supported by an auxiliary ground engaging wheel corresponding to wheels 16 of frame 10 in FIG. 1. Thus, it will be understood that in the subsequent description of the several embodiments comprising the invention, and also in the claims, by reference to a frame or frame structure 10 the same is to be understood as referring generally to a suppoting frame, wheel supported or not, and whether the frame comprises a vehicle utilizing its own power unit or is adapted for connection to a different vehicle for propulsion thereby.

Considering now FIG. 2 with FIG. 1, structure for supporting moldboard 12 is illustrated as including an overlying circle 22 which has rotative mounting on a gooseneck or A-frame 24 which sustains the draft of the moldboard through a ball and socket joint connection 26 with the front portion of the supporting frame 10. This joint permits a universal movement of rear end of the A-frame, together with the circle and moldboard 12 carried thereby. As shown best in FIG. 2, aforesaid mounting of A-frame 24 is such that circle 22 and moldboard 12 carried thereby, can be raised and lowered relative to the terrain or surface over which the vehicle is propelled, as in a grading operation by rotating forwardly extending control shafts 28 and 30. As shown the rear ends of shafts 28, 30 extend to cab 14 and their forward ends each have crank arms 32 having universal joint pivotal connections with the upper ends of adjustable links 34. The lower ends of these downwardly extending links 34 have universal joint pivotal connections at 36 with the outer ends of the transverse rear bar 38 of the A-frame 24 which is diametrically arranged across circle 22. Control shafts 28, 30 and associated 32 and 34 are conventionally provided as standard equipment on different motor graders. Control shafts 28 and 30 are customarily driven clockwise and also counterclockwise by engine power through selective clutching operations performed in response to manipulation of certain control levers conveniently located for access by the operator in the cab 14. Such controls are also relied upon in the functioning and utility of the present invention and are therefore considered to be an important part of the operating controls for the moldboard 12 and as hereinafter more particularly described have a novel and unexpected function in cooperation with other controls and mountings for the moldboard 12 which provide the increased utility and efficiency of earth moving and grading operations achieved in accordance with the present invention.

However, by reason of their appointments, applicant's moldboard may be also operated and utilized as moldboards have been conventionally used and operated in the past. Thus, if it is desired to raise or lower the moldboard 12, selective rotation of the two control shafts 28 and 30 will swing their associated crank arms 32 and links 34 either upwardly or downwardly to raise or lower the moldboard as the case may be. As a secondary control manipulation, if it is desired to tilt the moldboard, one end of the moldboard may be raised and/or the other end lowered by rotating one or both of the control shafts 28 and 30 in the same direction. Thus if shafts 28 and/or 30 are rotated in a clockwise direction the left hand side of circle 22 and thereby the corresponding end of moldboard 12 will be raised effecting a decline of the moldboard downwardly to the right. Rotating the shafts in the opposite direction will tilt the moldboard and circle in the upper direction. On the other hand, rotating control shafts 28, 30 in opposite directions will effectively raise or lower circle 22 and thereby also moldboard 12; the same being raised when links 32 are swung outwardly and away from each other and being lowered when links 32 are moved toward each other. Side shifting of the circle 22 and its supported moldboard 12 is also possible and is effected through side shift rack 40, in the form a a sector gear 42 of relatively large radius which is suitably supported for rotative movement above the rear portion of A-frame 24 and circle 22. Meshing with sector gear 42 is a vertically disposed pinion 44 rotatably mounted below housing 46 into which enters a controllable drive shaft (not shown) from within the operator's cab 14, the rotary motion of which is transmitted to the pinion 44 through suitable worm gearing within the housing 46. For example, said controllable drive shaft has operative connection with a vertical clutching drive located in cab 14 and is adapted for operation in response to the manipulation of a suitable control lever provided therein. The lower rim of sector gear 42 has one or more apertures 48 for selectively mounting a ball stud adapted to establish a universal pivotal connection with the upper end of an adjustable link 50 extending diagonally downward to a universal pivotal connection 52 with one end of A-frame crossbar 38. By effecting the power driven rotation of pinion 44, the sector gear 42 can be swung to the right or to the left for imparting a corresponding swinging movement through A-frame and circle 22 to the moldboard 12, such swinging motion occurring on the system of the depending links 34. By this arrangement the circle frame 22 and thereby the moldboard 12 can be displaced laterally a substantial distance beyond the normal position of the moldboard under the frame 10. Circle 22 may also be rotated about its vertically considered axis 54 (FIG. 4) by appropriate means, as for example a power driven pinion 56 which meshes with internal gear teeth 58 formed around the inner periphery of the circle frame 22. Thus through the operation of pinion 56, circle 22 may be rotated in any of its raised, lowered, titled or shifted positions, so as to also dispose the moldboard 12 at any desired angle within the arcuate extent of the sector gear 58 relative to the direction in which the vehicle is forwardly propelled. It will be understood that suitable controls will also be provided in the operator's cab 14 for rotating pinion 56 in either a clockwise or counterclockwise direction to effect the desired angular positioning of circle 22 and moldboard 12. Any suitable mechanism for effecting said circle rotation may be used, as for example that illustrated in Gustafson U.S. Pat. Nos. 2,189,286 and 2,258,890. It will also be understood that shafts 28 and 30 as well as their associated crank arms 32 and links 34 may be replaced by suitable hydraulic motors as may also sector gear 42 and its associated link 50. When the invention is mounted on a frame separate from the propelling vehicle, it may be more practical and feasible to utilize such a modified structure. Said adjustments of the circle may also be obtained utilizing manually operated cranks.

Referring now more particularly to FIG. 3, and considering the same in conjunction with FIGS. 2 and 4, circle 22 has a pair of rigid depending arcuate shaped arms 60 which extend downwardly in spaced parallel relation behind the moldboard 12 and to the lower ends of which are pivotally mounted moldboard supporting structure which in this first considered embodiment of the invention comprises a generally U- or C-shaped member indicated generally at 62 having as shown in FIG. 4 an intermediate rearwardly located bight portion 64 and a pair of parallel spaced fore and aft extending legs 66. As shown in FIG. 2, the central area of the bight portion 64 of this member is bent upwardly at 65 to provide clearance and increase the general utility of the structure as for example in windrowing as later more particularly described. Legs 66 of said U frame 62 have depending rigid portions 68 adjacent their forward ends (FIG. 3) containing aligned opening 70 which receive pivotal members 72 extending through aligned similar openings in the lower ends of the circle depending arms 60 in order to pivotally secure said U member 62 to said depending arms 60 of the circle 22. Said pivotal members 72 are in aligned coaxial relation and define a first generally horizontally disposed axis about which the moldboard 12 may be rocked and hereinafter identified as axis H—H. Forwardly of said axis H—H, the forward ends of legs 66 of said U-frame are in turn pivotally secured between spaced ears 74 rigidly fixed to the rear of slide members 76 for pivotal movement about a pair of spaced upright axes V—V defined by pivot members 78 which are disposed at right angles to the coincident axes H—H of pivotal connections 72 and are also in spaced parallel relation to the generally upright axes C—C (FIG. 4) about which the blade sections of the moldboard 12 are hinged, as hereinafter more particularly described.

Referring now also to FIG. 5, moldboard 12 comprises a plurality of longitudinal blade sections 80. In the illustrated embodiment moldboard 12 comprises two such blade sections 80, the adjacently disposed or inner ends of which have vertically spaced apertured ears 82 which are interleaved with each other and with rearwardly projecting vertically spaced ears 84 of an intermediately disposed spool or pivot member 86 (FIG. 2). Said ears 84 of the pivot member also have apertures, the same being aligned with the aperture of ears 82 of the two blade sections and receiving a pivot member 88 by which the two blade sections 80 are hingedly joined to the intermediate pivot member for relative hinging action or adjustment about the aforementioned generally vertical or upright central axis C—C, the same being appropriately secured as by locking devices 89 (FIG. 3).

As shown best in FIGS. 2 and 6, each said blade sections 80 is provided on its rear side with a pair of vertically spaced parallel longitudinal guides or runs 90 which are respectively welded to upper and lower regions of a supporting frame 92 in turn welded to the rear side of said blade sections 80 so as to accurately locate said guides 90 in spaced parallel relation with respect to each other and at a determined position behind the front surface of the blade sections 80 so as to define planes substantially parallel to and adjacent the vertical axis C—C of the pivot 88 about which the two blade sections 80 are mounted to hinge. As illustrated best in FIG. 3, slides 76 each have blocks 94 and 96 bolted and/or welded to the upper and lower edge portions thereof on their forward side forming ways 98 which slidably engage about and receive said guides 90 to permit longitudinal movement of the blade sections 80 relative to the supporting U-frame 62 by which the moldboard 12 is thus mounted to the circle 22 and so as to accommodate hinging of said blade sections about pivot 88.

In the embodiment of the invention now being described and best illustrated by FIG. 4, hinging of the two blade sections 80 relative to each other and about pivot 88 is conveniently obtained utilizing a pair of operator-controlled hydraulic devices or rams 100, each of which comprises a cylinder 102 pivotally connected at its remote end to adjacent one corner of the U-frame 62 as by means 104, the axes of said pivotal connections being disposed generally parallel to axis C—C of pivot 88 about which the blade sections hinge and axes V—V about which slides 76 are pivotally connected to legs 66 of U-frame 62. The remote end of piston stem 106 of said hydraulic devices 100 is in turn pivotally connected at 108 to rearwardly extending projections or ears 110 fixed to the rear side of the blade sections 80 intermediate pivot 88 and slides 76 but close to pivot 88, pivotal connections 108 also being in spaced parallel relation to axis C—C of pivot 88 about which blade sections 80 swing therebetween and axes V—V about which slides 76 swing on their connection to the ends of legs 66 of connector 62. Hydraulic devices 100 are preferably double acting so that fluid added to one side of the piston within the cylinders 102 of the hydraulic device 100 will push their stems 106 outwardly and when added to the opposite side will retract stems 106 whereby the hinged connection of the two blade sections 80 at 88 may be moved in both forward and reverse directions to effectively vee the moldboard 12 with its apex locatable either forwardly or rearwardly from the plane which its blade sections assume when aligned as illustrated by FIG. 4. Abutment pieces 112 (FIG. 4) may be releasedly bolted to adjacent the outer ends of guides 90 which are engaged by slides 76 to limit the distance through which the blade sections 80 may be inwardly veed about pivot 88, projections 110 serving as abutments to limit the outward veeing of the blade sections. It will be also understood that the extent of both the outward and inward veeing of the two blade sections will be also limited by the distance through which the pistions or plungers 106 can be telescoped within cylinders 102 of hydraulic devices 100 so that abutment pieces 112 serve principally as safety devices. It will be understood that in the aforedescribed veeing of the blade sections 80 pivot 88 will move diametrically of circle 22 or in a forward direction assuming the extension or withdrawal of pistons 98 is in substantially equal amounts. However, if one is extended and/or retracted a greater amount than the other the effect will be to longitudinally displace the two blade sections 80 along ways 98 rather than changing their angular relation about pivot 88. Thus by appropriately extending one device 100 while retracting the other, it is also possible to side shift the moldboard so as to locate its axis C—C (pivot 88) to one side or the other of the circle center 54 and without veeing the blade sections. Abutment 112 in these instances serve to prevent unintentionally moving a blade section out of its sliding reception in the way 98 of its supporting slide 76. Such adjustments further increase the versatility of applicant's moldboard in a grading operation as will be later explained.

By reason of the legs 66 of the U-shaped connector 62 are also pivotally connected to the two depending arms 60 of the circle 22, it is also possible to tilt the moldboard 12 about axis H—H and thereby to change or vary the pitch of the blade sections 80. This is also conveniently obtained under the control of the operator by utilizing a second pair of hydraulic devices indicated generally at 114, each of which also include a cylinder 116 having its remote end pivotally connected as at 118 to a projection 120 on the corresponding side of the circle 22, the remote end of stem 122 of its telescoping piston or plunger being pivotally connected at 124 to upright ear portions 126 fixedly secured at the adjacent corners of U-shaped connector 62, the axes of said pivotal connections 118 and 124 being parallel to axis H—H of pivotal connections 70 and disposed to either side of a plane including said axis H—H and normal to the plane of circle 22. Thus by adding and/or withdrawing fluid from cylinder 116 to effect withdrawal of plunger stem 118 or its retraction from within cylinder 112. U-shaped connector frame 32 and thereby moldboard 12 supported on the ends of its legs by slides 76 may be rocked or tilted about axis H—H to set the pitch of its blade section at required angles off vertical and/or normal to the circle plane.

Referring now to FIGS. 13–16 a second and preferred embodiment of the invention is there illustrated. In this second embodiment the generally C-shaped connector 62 has been replaced by a pair of connectors indicated generally at 262, said connectors 262 each having their one and inner end pivotally connected with slides 200 as by pivots 278 which define the aforementioned spaced essentially upright or vertical axes corresponding to V—V as discussed in connection with the first described embodiment. Slides 200 correspond generally in function as well as utility to slides 76 of the first described embodiment. Structurally, however, slides 200 illustrate an alternate construction of slide which can also be employed in the first described embodiment. Thus as shown by FIGS. 13 and 14 each of said slides 200 comprise a pair of spaced C-shaped plates 202 butt welded to upper and lower cross pieces 204. Butt welded to said cross pieces 204 and to the inner sides of C-shaped plates 202 are horizontal pieces 206 having aligned apertures which are aligned with the ears 261 of the connector pieces 262 and through which pivot member 278 extends pivotally connecting each of the connectors 262 to a respective slide 200. On the forward side of said pieces 204 are blocks 208 face welded thereto and positioned to engage one side of the respective runs 96 and 98 of the moldboard 12. Corresponding blocks 210 are provided on the opposite side of said runs, blocks 208 and 210 being secured in spaced relation by C-members 212 which together with said blocks 208 and 210 provide receiving ways 95 as aforedescribed which receive runs 96 and 98 to accommodate longitudnal movement of the blade sections 80 relative to the slides in the veeing of the moldboard as described in discussing the first embodiment. Circle 22' in this embodiment is supported and also constructed as is circle 22 of the first embodiment. However, its depending arms although similar in function and utility to arms 60 of circle 22 have a slightly different shape for reasons which will be later apparent. Said depending arms 260 have their lower ends pivotally connected to the connectors 262 as by means 272 so as to support the moldboard 12 and also define a horizontal axis H—H about which the moldboard 12 can be tilted to adjust its pitch as in the case of the first embodiment. As in the first embodiment, hydraulic devices 114 are employed to effect tilting of moldboard 12 about axis H—H. However, in this preferred embodiment, these hydraulic rams or devices 114 have their cylinder 116 pivotally connected to an outstanding boss 110 as by pivotal connection means 118 and the stem of their plunger 122 pivotally connected to the upper end of the connector member 262, as by pivotal connection 124. To provide strength and rigidity to the structure, the upper connection of the cylinder 116 is mounted between boss 120 and a piece 110 which is shown in FIG. 15 as also welded to the plate 116. Similarly the lower pivotal connection 124 of the plunger stem is mounted between connector 262 and an overlying link 212 through the lower end of which pivoted connection member 272 also extends. Depending arms 260 of the circle 22' comprise a main portion 214 and an overlying plate 216. Between the plates 216 of the two depending arms of circle 22' are a horiznotally extending tubular brace bar 218 and a pair of inclined reinforcing struts 220 which have their upper ends welded to the rear of the circle 22' so as to rigidly locate the depending arms 260 in proper spaced parallel relation for pivotally mounting the connectors 262 thereto and to accommodate the aforedescribed tilting and pivotal movements of the moldboard 12 relative thereto.

To accommodate veeing of the two blade sections 80 about their connector 88 (axis C—C) by which the two blade sections 80 are connected to each other and to intermediate pivot member 86 each of said blade sections 80 has a pair of rearward extending vertically apertured bosses 222 and 224 corresponding generally to bosses 110 of the first described embodiment. However, as illustrated best by FIGS. 15 and 14, bosses 222 serve to pivotally support the cylinder 226 of a hydraulic ram or device 227 having a reciprocating plunger 228. Cylinder 226 is pivotally connected to between bosses 222 as by connection member 230 and the outer end of the plunger stem 228 is pivotally connected to between bosses 224 on the second blade section by pivotal connection member 232. It will be understood that pivot connection members 230 and 232 are disposed in spaced parallel relation with each other and also with the axis C—C of pivot connector 88 by which the blade sections 80 are pivotally connected to the intermediate pivot member or spool 86. Cylinder 224 is suitably connected to a source of hydraulic fluid such that by the application of fluid the plunger stem 228 may be moved inwardly and also retracted from the cylinder 226 so as to accommodate veeing of the two blade sections about connector 86 (axis C—C) in a forward direction and in a reverse direction. It will be appreciated that in this preferred embodiment of the invention, the described operation of the hydraulic device 227 has the desired effect of swinging the blade sections 80 about pivot connection member 88 so that axis C—C always moves in a direction such that the two blade sections are angled an equal amount. When the moldboard is centered beneath circle 22' this movement of axis C—C is along a plane which includes axis 54 of the circle. When the moldboard is side shifted then the movement of axis C—C parallels said plane which includes axis 54 of the circle. However, unlike the first described embodiment, the operation of hydraulic device 227 has no effect as far as side shifting the moldboard 12 and its blade sections 80. For this purpose a second hydraulic device 250 is employed. Said hydraulic motor as shown in FIGS. 14 and 15 has a cylinder 252 which is pivotally mounted by connector 254 between portions 206 of one of the slides 200 and has the outer end of itis plunger stem 256 pivotally connected to between rearwardly extending bosses 224 as by connector 258. It will thus be apparent that in accordance with whether plunger 256 of hydraulic device 252 is extended or retracted the moldboard will be side shifted thereby in slides 200 either to the left or to the right, an in a distance proportioned to the amount of extension or retraction of the plunger stem 256.

As will be apparent by comparing FIG. 15 with FIG. 4, because the two hydraulic devices 227 and 250 are located close to and longitudinally of the moldboard 12, this embodiment permits a more compact structure and which can be taken advantage of by utilizing longitudinal extending shields 280 which are secured to the top of the moldboard blades 80. These shields 280 together with a second shield 282 secured to the pivot member 86 at its connection 88 and held in centered relation over the inner ends of the shields 280 as by springs 284 make it possible to cover both the plungers opearting in the two hydraulic devices 227 and 250 and also the guides or runs 96 and 98 on which slides 200 slide. Thus in this embodiment there is less opportunity for dirt or other debris boiling over the forward surface of the moldboard in a grading operation and fouling the runs 96, 98 or steps of the hydraulic device to interfere with their operation. It will be understood, of course, that similar shields 280 and 282 might be provided in the same locations in the first described embodiment and will also protect runs 96, 98 but less completely the plungers of hydraulic devices 100.

Referring now to FIG. 17, instead of locating hydraulic motor 227 longitudinally of the two blade sections so that it straddles the pivotal member 86 as described in the preferred embodiment of FIGS. 13–16, a single hydraulic motor could also be mounted to exert a push-pull effect directly on the pivot member 86. Thus, in FIG. 17, the construction is exactly the same as the construction described above in connection with FIGS. 13–16, except that in this instance rearward extending bosses 222 and 224 serve to pivotally support the ends of a U-shaped support 300 having pivotal connection with said rearward extending bosses 224 and 222 as by vertical pivot connectors 302. Said pivotal connectors 302 are also disposed parallel to each other and to the axis C—C of pivot connector 88. C-yoke 300 serves to pivotally support cylinder 304 of a hydraulic ram or device indicated generally at 306, cylinder 304 being pivotally connected to support 300 as by connector 308 which also defines a pivotal axis generally parallel to axis C—C. Plunger 310 of hydraulic device 306 in turn has its outer end pivotally connected as at 314 to a rearwardly extended boss 312 provided the pivot member 86. Connection 314 may be either of the universal type or having an axis also parallel to axis C—C. Preferably, hydraulic device 306 will be of the type wherein its plunger 310 includes a rearwardly extending portion 316 provided with an abutment 318 as to limit the extension of plunger 310 and thereby the forward veeing. Reverse veeing of the two blade sections is accomplished by retraction of plunger 310 into its cylinder 304 and the extent of the resultant veeing will be limited by the engagement of boss 312 with the forward end of cylinder 304.

It will be understood also that the aforedescribed veeing of the two blade sections 80 might be accomplished by mechanical linkage means. One such arrangement is illustrated in FIG. 18 wherein a connector link 400 has one end pivotally connected to rearwardly extending boss 222 as by pivotal connection means 402. The other end of said connector link member 400 has a plurality of spaced apertures 404 which may be selectively aligned with opening 406 in rearward extending ear 224 to receive a locking bolt 408. In this construction the extent of veeing and the direction thereof will be determined by the one of openings 404 which is aligned with opening 406 and connected thereto by locking member 408.

Figure 20:
Figure 21:
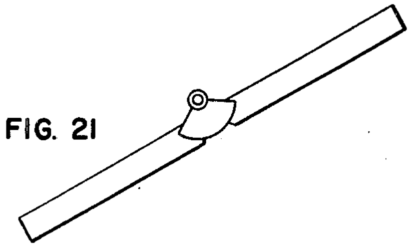
Figure 22:
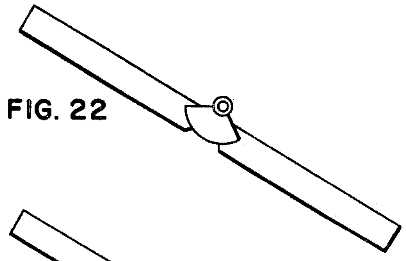

Referring therefore now to that sheet of drawings containing FIGS. 20 through 34, there are illustrated some of the possible settings of the moldboard 12 and its blade sections 80 which demonstrate the versatility of the invention in performing numerous grading operations. FIG. 20, for example illustrates the moldboard 12 having its blade sections 80 arranged in a substantially straight line and located normal to the direction of propulsion of the vehicle. This is the position of the moldboard, for example, as illustrated in FIGS. 1 through 5. By rotating pinion 56 in one direction, circle 22 may be rotated to locate moldboard 12 at some angle to the direction of propulsion of the vehicle. This is illustrated by FIGS. 21 and 22 in which the direction of angling and the amount thereof is determined by the direction in which pinion 56 is turned and the angle through which the circle is rotated about its axis 54.

Figure 23:
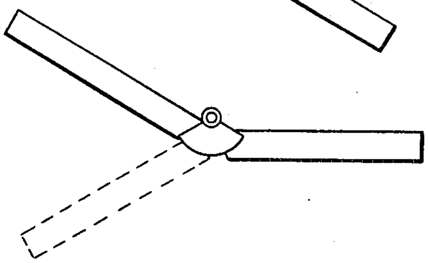
Figure 24:
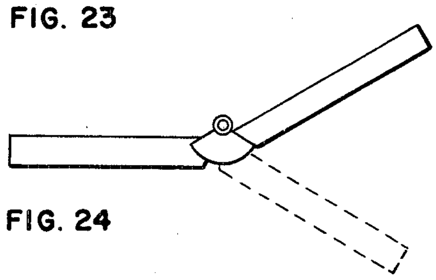
Figure 25:
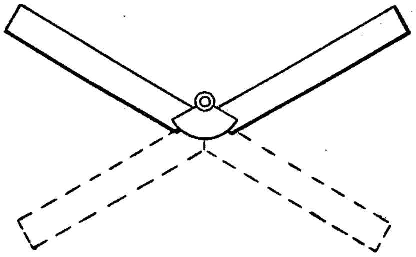

By operating both hydraulic devices 100 of FIG. 1 or motor 226 of FIG. 15, or device 306 of FIG. 17, or link 400 of FIG. 18, the two blade sections 80 may be swung about pivot connector 88, that is about axis C—C to vee the moldboard 12 in a forward direction as indicated by full lines in FIG. 25 or to the rear as illustrated by dotted lines in said FIG. 25. Also, if after the two blade sections have been thus veed, the circle 22 or 22' is also rotated about its axis 54, other dispositions of the moldboard are possible. Thus as illustrated by FIGS. 23 and 24, if the two blade sections are angled, first as indicated by full lines in FIG. 25 and circle 22 or 22' is then rotated, it is possible to locate one blade section normal to the propulsion path of the vehicle and with the other blade section in a trailing position. Conversely, if the blade sections are initially adjusted with their axis C—C to the rear as illustrated by the dotted lines in FIG. 25, then by rotating circle 22 or 22' either blade section can be again located broadside to the movement of the vehicle and the other blade section located in a leading position, as is indicated by the dotted lines in FIGS. 23 and 24.

By veeing the two blade sections 80 with their pivot member 86 to the rear, the load of the moldboard is proportionately increased. By veeing the two blade sections in the opposite direction the moldboard can be utilized to cut or grade narrower areas. It will be understood that by rotating control shafts 28, 30 the apex of said V cut can also be shifted with respect to the tracks of the vehicle. This is to say that the apex of the veed moldboard can be centered between the tracks of the vehicle or disposed closer to either the left or right hand side thereof.

Figure 26:
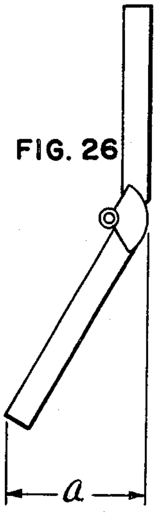

Also if it is desired that the moldboard cut through a very narrow path, one blade section can be located substantially parallel to the direction of travel of the vehicle and the other blade section set at some small angle off said parallel relation as is illustrated by FIG. 26. For example, it has been found possible in practice to locate the two blade sections of a 14 ft. moldboard in this way to permit grading a square only 28 inches wide, represented at *a* in FIG. 26.

Figure 32:
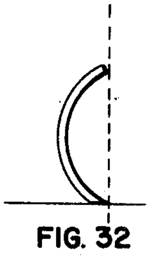
Figure 33:
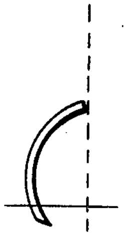
Figure 34:
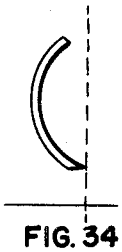

Turning next to FIGS. 32, 33 and 34, it will be seen that with the two blade sections in a straight line, disposed normal to the direction of travel of the vehicle or at some angle thereto as illustrated by FIGS. 20, 21 or 22, it is also possible to vary the depth of cut. In each of the embodiments described this is obtained by operating hydraulic devices 114 to tilt the moldboard 12 about its axis H—H. FIG. 32 illustrates the normal or vertical pitch of the moldboard. By operating hydraulic devices 114 to withdraw plunger 118 into the cylinder thereof, the effect is to rock the moldboard 12 downwardly about horizontal pivot axis H—H which changes the pitch of the blade section to one as illustrated in FIG. 33, where the blade digs more deeply into the terrain. When the plungers 118 are moved in reverse out of the cylinders of said hydraulic devices 114, the effect is to tilt the blade sections in an opposite direction so that they are now raised above the terrain as illustrated by FIG. 34.

Figure 28:
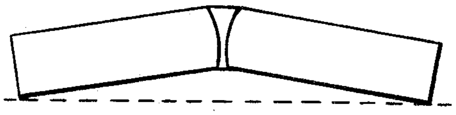
Figure 29:
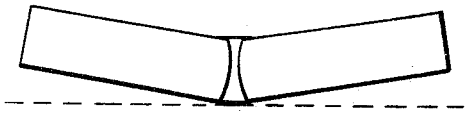
Figure 30:
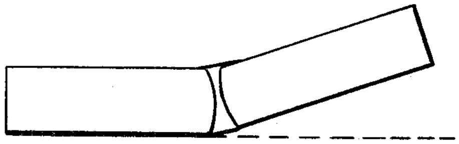
Figure 31:
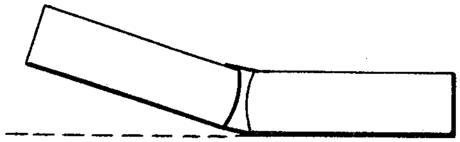

This ability to tilt or rock the moldboard about horizontal axis H—H is used to advantage by veeing the blade sections to the attacking position, as is illustrated for example by FIGS. 28–31. Referring thus to FIG. 28, for example it is possible to relocate the blade sections 80 of the moldboard so that their lower cutting edges are higher at their center than at their outer ends. This position is particularly useful in road scraping. Such a positioning of the blade sections is readily obtained in accordance with the invention by first moving the pivot member 86 of the moldboard so as to locate axis C—C in a forward direction. This is obtained by conjoint operation of hydraulic devices 100 in the FIGS. 1–4 embodiment by operation of device 227 in the embodiment of FIGS. 13–16, on hydraulic device 306 in the FIG. 17 embodiment or by shifting control link 400 in the embodiment of FIG. 18. Moldboard 12 is then tilted about horizontal axis H—H through the operation of hydraulic devices 114. The relative height of the center of the moldboard to that of the outer edges is the combined result of the angling of the two blade sections as illustrated by full lines in FIG. 25, and the extent of tilting of the moldboard blade sections as illustrated by FIG. 34. The depth of cut of the two blade sections of the moldboard may be then regulated by operating shafts 28, 30 to raise or lower the circle frame 22 or 22′. It will be appreciated also that by selective operation of shaft 28 or 30 circle 22 or 22′ may be also tilted to the left or to the right so as to locate the lower cutting edge of one blade parallel to the terrain, for example, and the other at an inclined angle thereto. Such is illustrated by FIGS. 30 and 31. Also, as illustrated by FIG. 29, if the two blade sections are initially veed as indicated by full lines in FIG. 25, and the moldboard 12 tilted about horizontal axis H—H as described so that the moldboard is tilted in a downward direction as indicated by FIG. 33, the soil cutting edges of the two blade sections will then assume the V-shape illustrated by FIG. 29, wherein the outer edges of the blade are higher than at the center thereof.

Figure 27:
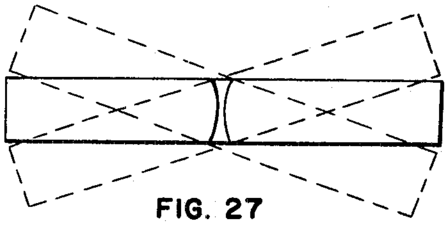

It will also be appreciated that by the selective operation of shafts 28 and 30 either end of the moldboard can be raised by reason of the tilting of the circle 22 or 22′ so that if the blade sections are left in a straight line they can be made to assume positions as illustrated by phantom lines *b* or *c* in FIGURE 27.

The above discussed figures are only representative of many possible adjustment and settings into which the individual blade sections and the moldboard can be arranged and so makes a vehicle equipped with the invention a truly versatile tool in road construction and wherever grading is important.

An important feature of the invention is the provision made which avoids interruption or gapping between the blade sections when they are veed, that is to say when they are in any other angular dispositions than a straight line. For example the angling of the two blade sections as illustrated by FIG. 25.

As illustrated, perhaps best by end views, FIGS. 2, 13 and 7, the forward surface 130 of the two blade sections 80 and the forward surface 132 of the pivot member 86 each have a generally concave curved shape in vertical section, which are complementary. In the instance of the two blade sections 80 their surfaces 130 may be considered to be generally cylindrical. However, the forward surface 132 of the intermediate pivot member 86 has its concave shape revolved about axis C—C of connector 88, on which the two blade sections 80 are hinged relative to each other and to the intermediate pivot member 86. Preferably, this concave shape is revolved through an angle of at least 110°. The adjacent inner or vertical edges 134 of the two blade sections 80 are given complementing convexly curved shapes (FIG. 9) such that said edges 134 continuously engage the curved surface 132 of the pivot member 86 and remain in contiguous relation therewith as the blade sections are hinged on connector 88 about axis C—C. Thus when the two blade sections are raised in a straight parallel aligned relation, as for example as illustrated by FIG. 20, their cylindrical surfaces 132 effectively blend with the exposed portion of the cylindrical surface 132 of the pivot member 86 so that the moldboard presents an uninterrupted continuous surface of generally concave or concave-shaped across the full extent of its forward face or side. Also, to whatever angular position the two blade sections may be pivoted about pivot 88 the only effect is to change the exposure of usrface 132 of the pivot member 86. However, by reason of the elected shape thereof, the moldboard continues to present an uninterrupted continuous forward side comprising a blend of the forward surface 130 of the two blade sections and the forward surface 132 of said pivot member 86. It will also be understood that although most usefully, and preferably, moldboard 12 has a concave forward side, the forward side of the two blade sections 80 could be planar or convex in shape and in this event the surface 132 of the pivot member 86 would be similarly shaped, as would also the inner ends 134 of the two blade sections which follow said surface 132 of the pivot member so as to remain in contiguous relation therewith in the veeing of the two blade sections.

Because the outer vertical edges of the blade sections are occasionally used in a grading operation and therefore are subject to wear, the outer edges of the two blade sections 80 are suitably recessed at 140 to receive replaceable wear pieces 142 which are suitably bolted thereto as at 144. Similarly because the lower edges of the blade sections 80 are also subject to wear, they are similarly recessed as indicated at 146 in FIG. 3, for example, and receive replaceable wear pieces 148, which are also bolted thereto at 150. Similarly, since the bottom edge of the pivot member 86 serves as a continuation of the soil cutting edge of the blade section 80 it is also subject to wear and accordingly the pivot member 86 is recessed at 152 (FIG. 7) to receive replaceable wear pieces 152 which may be attachably secured thereto as by bolts 154.

Also in order to assist the operator when changing the setting of the blade section 80 as discussed above, the invention provides indicating means to advise the operator when, for example, a previously veed blade section 80 has been returned to a straight line relationship as illustrated by FIG. 20. It also provides indicating means 162 which advise when the pivot post 88 is exactly centered and/or positioned behind axis 54 of circle 22 or 22′ and it also includes indicating means 164 which advises when the pitch of the blade sections of the moldboard is essentially vertical as illustrated by FIG. 32.

Indicator means 160 is illustrated for example in FIGS. 3 and 14. Indicator means 162 are shown in FIGS. 4 and 15; and indicator means 164 are shown in FIG. 14.

Referring therefore now to FIG. 12, each said indicating means 160, 162 and 164 comprises a switch in series with a lamp appropriately located on the operator's control panel within his cab 14 and preferably adjacent the controls which operate the particular adjustment of the blade sections. For example in FIG. 12, indicating switch 160 is in series with an indicator lamp 168 so that assuming master switch 170 is closed, the closing of switch 160 completes the circuit via lines 172 and 174 to a battery or other source of electrical power 176 carried by the vehicle.

Referring now to FIGS. 10 and 11, it will be appreciated that lamp 168 will therefore be energized only when the pitch of moldboard 12 is vertical. This is so because as shown by FIG. 3 (and similarly in FIG. 13) switch 160 is contained within a housing 180 mounted on cylinder 114 of hydraulic motor 116 and its actuation is controlled by a rod 182 pivotally connected at one end to boss 124 and extending through a tube 184 passing through housing 180. As shown, tube 184 is provided with a cut out at 186 and rod 182 includes a dwell area 188 in which resiliently seats a switch actuator 190 which extends through the cutout 186. Dwell 188 is so located on rod 182 that it aligns with cutout 186 to receive actuator 190 only when plunger 122 is so extended from cylinder 116 as to locate the moldboard 12 at 90° or vertical. In this position as shown, contacts **160*a* and 160*b* of the switch 160 are closed and so lamp 168 is energized. However, in any other position of tilt of the moldboard and its blade sections about pivotal axis H—H, dwell 188 will have moved out of alignment with the actuator 190 which will therefore ride on the outer surface of rod 182 which is aligned with cutout 186. Thus actuator 190 will hold contacts 160*a* and 160*b* out of engagement with each other and lamp 168** will remain dark.

Means 162 are similarly constructed as are means 164. Thus in FIG. 4 indicating switch 162 is mounted on one leg 66 of connector 62 and has its actuating rod 182 pivotally connected to slide 76, such that when the two blade sections 80 are in a straight line switch 162 will complete a circuit, including lamp 192. In FIG. 15 switch 162 is mounted on cylinder housing 224 and rod 182 is pivotally connected to ear 222 such that again lamp 192 illuminates only when the moldboard blade sections are in a straight line.

In similar fashion indicating switch 164 is mounted on cylinder housing 102 in the FIG. 4 embodiment and its rod 182 pivotally connected to ear 110. In the FIG. 14 embodiment indicator switch 164 is mounted on housing 252 and its rod 182 is pivotally connected to one of the two blade sections 80, wherefore again in each instance closing of switch 164 completes a circuit including lamp 194 as illustrated by FIG. 12, but this occurs only when pivotal connector 88 is centered behind axis 54 of circle 22 or 22'. It will be appreciated also that cutout 186 is purposely larger than dwell 188 to accommodate the small amount of displacement of the cylinder 188 which occurs about the pivotal connection of rod 182 with ear 110, et al. Preferably also actuator 190 has a rounded end or roller 196 of small diameter so as to simplify the alignment thereof with dwell 188 in said pivoting of rod 182. It will be apprecitaed therefore that switches 160–162–164 and their corresponding lamps 168, 192, and 194 provide simple but effective means for indicating to the operator when, the blade sections are in a particular alignment. For example, in the first embodiment when plunger 106 of the hydraulic devices 100 are actuated to return the blade section 80 to an essentialy straight line position as indicated by FIG. 20, lamp 168 is energized. However, when lamp 168 is dark this indicates that the blade sections are out of such straight alignment. Consequently as plunger 106 is withdrawn or moved into cylinder 102, as the case may be, through operation of appropriate controls in the operator's cab the lamp 168 will light up as soon as the plunger has been moved far enough to effect realignment of the two blade sections into a straight line. Thus indicator lights 168, 192 and 194 provide effective guide means for indicating not only aligned positions of the blade sections of the moldboard 12, but also help to indicate to him the extent of any one adjustment being attempted, as for example changing the pitch of the moldboard blade sections, veeing them either forwardly or rearwardly or side shifting them.

Although the invention has thus far been described as utilizing a moldboard 12 comprising two blade sections hinged together as by an intermediate pivot member 86, it will be understood that the invention is adaptable to a moldboard comprising any other number of hingedly formed blade sections. For example in FIG. 19 a three blade section moldboard is illustrated. Referring to said FIG. 19, outer blade sections 80A and 80B correspond to the blade sections 80 in each of the previously described embodiments. Each of said blade sections 80A and 80B is shown slidably supported by means of a slide 76, although a slide such as 200 utilized in the embodiment of FIGS. 13–16 may also be employed. Blade section 80A has hinged connection with a first pivot member 86A and blade section 80B has hinged connection with a second pivot member 86B. Pivot members 86A and 86B are structurally the same as pivot member 86. Between pivot members 86A and 86B is a third blade section 80C having one end thereof hingedly connected to pivot member by pivotal connectors 88A, 86B and its other end hingedly connected to pivot member 86A by means of a pivotal connector 88A. Pivotal connectors 88A and 88B also serve to connect outer blade sections 80A and 80B to pivot members 86A and 86B, the mode of connecting being exactly as described for connecting blades 80 to pivot member 86. In this instance pivotal connectors 88A and 88B are also vertically disposed and in spaced parallel relation and are so located as to define a plane with which blade sections 80A, 80B and 80C align when they are in aligned relation with each other. Slides 76 are slidably supported on blade sections 80A and 80B as in the second embodiment illustrated by FIGS. 13–16. However, unlike in that embodiment, blade sections 80A and 80B are independently hinged about the respective pivots 88A and 88B. This is obtained through a pair of hydraulic devices 500A and 500B. Each said hydraulic motor includes a cylinder 502 which is pivotally carried between a pair of vertically spaced ears 504 fixed to the rear of a respective blade section 80A or 80B, and adjacent pivotal connection 88A or 88B as the case may be. Each of said hydraulic devices 500A and 500B also include a plunger 506 having pivotal connection to between a pair of provided ears 508 which protrude rearwardly from the third blade section 80C. Connections 510 by which cylinders 502 are pivotally supported between ears 504 and pivotal connections 512 by which plungers 506 are pivotally mounted between ears 508 are disposed in spaced parallel relation to each other and to pivotal connectors 88A and 88B. Pivotal connections 510 are located to outside connectors 88A and 88B and pivotal connections 512 are located intermediate said pivotal connectors 88A and 88B. Of consequence by the extension of plunger 506 from the cylinder of hydraulic device 500A, for example, connector 88A will be moved forwardly and when the plunger is retracted, said pivotal connection 88A will be moved rearwardly. In similar fashion by extension and retraction of its plunger 506 hydraulic device 500B will correspondingly effect pivotal connector 88B. It will therefore be understood that by holding one of the hydraulic devices immovable and actuating the plunger of the other, veeing of the moldboard can be accomplished about either one of the pivotal connectors 88A and 88B so that the moldboard of FIG. 19 can be operated essentially the same as the moldboard of the other described embodiments to obtain a veeing of the moldboard in either a forward or rearward direction. However, it is also possible to swing both of the hinged blade sections 80A and 80B about their respective pivotal connectors 88A and 88B by operating both hydraulic devices 500A and 500B so that the two outer blade sections are inclined relative to the third blade section 80C which may be kept, for example, in the illustrated plane and at right angles to the direction in which the supporting vehicle is being propelled. It will also be apparent that one of said blade sections might be swung in a forward direction and the other in a rearward direction and/or at different angles of inclination to blade section 80A. It will be further appreciated that the examples given to illustate the invention show that all of said objects, advantages and features can be obtained in a highly practical manner.

Thus having described my invention, I claim:

1. In combination with a propelling and supporting vehicle, a moldboard comprising a center pivot member and a pair of blade sections hinged to swing about said pivot member, a pair of first mounts each slidably keyed to the rear of one said blade sections to accommodate relative movement thereof toward and away from said pivot in the swinging said blade sections about said pivot, a frame mounted on the vehicle above said moldboard having arms depending behind the moldboard, and connector means pivotally connecting each said first mounts to a respective depending arm of said frame to accommodate pivoting of said mounts and the blade sections to which they are slidably keyed about first axes spaced parallel to the pivot member about which the blade sections are hinged to swing and also to be tilted about a second axis disposed at right angles to said pivot member and generally longitudinally of the moldboard, first extensible means by which the moldboard including said pivot and blade sections may be tilted to an adjusted position about their second axis, and further extensible means by which the blade sections may be slid relative to said first mounts and hinged about said pivot to assume a required angle, said frame being mounted on the vehicle for rotational as well as tilting and sidewise adjustment to accommodate varying of the lateral displacement and angular position of the blade sections relative to the axis of propulsion of the vehicle.

2. An attachment for a propelling vehicle comprising, in combination a pair of blade sections hingedly joined adjacent their inner ends to swing about an intermediately disposed vertical pivot, a slide member longitudinally slidable on the rear of each said blade sections toward and away from said pivot, a U-frame, first vertically disposed pivotal means connecting each leg of said U-frame to a respective one of said slide members, an attachment mount disposed over said U-frame and adapted for attachment to a propelling vehicle, said attachment mount having a pair of spaced depending arms, second horizontally disposed pivotal means connecting said depending arms of the attachment mount to a respective one of the arms of the U-frame, a pair of first extensible means each pivotally connected at one end to a respective blade section between the vertical pivot and the slide member thereon and pivotally connected at the other end to the U-frame behind the latter's pivotal connection to the slide members, said first extensible means being operable conjointly to displace the hinged connection of the blade sections fore and aft and operable individually to laterally displace said hinged connection, and second extensible means having opposed ends thereof pivotally connected to said U-frame and attachment mount to opposite sides of said second horizontally disposed pivotal means, said second extensible means being operable to adjust the tilt of the blades about said second horizontally disposed pivotal means.

3. An attachment as claimed in claim 2 wherein the forward side of said blade sections and intermediate pivot members presenting a common curved shape in transverse section, the forward side of said pivot member being effectively revolved about the axis on which blade sections hinge, and the adjacent transverse edges of the blade sections being shaped to remain in contiguous overlying relation with said forward side of the pivot member in the swinging of said blade sections about said axis.

4. An attachment for a propelling vehicle comprising, in combination a moldboard comprising a pair of blades hingedly joined to swing about an intermediately disposed vertical pivot, a slide member slidably mounted on the rear of each said blades, a pair of connector members first vertically disposed pivotal means connecting one of said connector members to a respective one of said slide members, a supporting frame spaced over said moldboard and adapted for attachment to a propelling vehicle, said supporting frame having a pair of spaced depending arms extending behind the moldboard and to either side of said intermediate pivot, second horizontally disposed pivotal means connecting each said connector members to a respective one of the depending arms of the supporting frame, a first extensible means pivotally connected to said blade sections in spaced relation on either side of the vertical pivot and rearwardly thereof, said first extensible means being operable to displace the hinged connection of the blades fore and aft to effect veeing of the blade sections, second extensible means having opposed ends thereof pivotally connected to said supporting frame and connector members, said second extensible means being operable to effect swinging of the connector members about said second horizontally disposed pivotal means to permit adjustment of the pitch of the blade sections of the moldboard.

5. The attachment claimed in claim 4 further including a third extensible means connected between one of said blade sections and the slide member slidably mounted on the rear thereof, said third extensibe means being operable to effect longitudinal displacement of the moldboard and in a direction paralleling said second horizontally disposed pivotal means.

6. An attachment as claimed in claim 4 wherein the forward side of said blade sections and intermediate pivot members present a common curved shape in transverse section, the forward side of said pivot member being effectively revolved about the axis on which blade sections hinge, and the adjacent transverse edges of the blade sections being shaped to remain in contiguous overlying relation with said forward side of the pivot member in the swinging of said blade sections about said axis.

7. The combination claimed in claim 1 wherein the frame is also mounted on the vehicle for elevational movement.

8. The combination claimed in claim 1 wherein the blade sections are pivotally connected adjacent their inner ends to a yoke, and the further extensible means are pivotally connected between said yoke and the center pivot member.

9. The combination claimed in claim 1 wherein the further extensible means include a member having one end pivotally connected to one blade section and its other end to the other blade section.

10. The combination claimed in claim 9 wherein the extensible means comprises link means pivotally connected to one blade section and having its other end provided with longitudinally spaced means for selective connection with the other blade member.

11. The combination claimed in claim 9 wherein the further extensible means comprises a hydraulic ram.

12. The combination claimed in claim 1 wherein said blade sections and center pivot member include an overlying shield mounted along the top thereof.

References Cited

UNITED STATES PATENTS

| | | | |
|---|---|---|---|
| 1,997,001 | 4/1935 | Lamb | 172—802 |
| 3,157,099 | 11/1964 | Ulrich | 172—802 |
| 3,241,254 | 3/1966 | Ulrich | 37—44 |

| | | | |
|---|---|---|---|
| 1,249,264 | 12/1917 | Wendell | 172—767 |
| 1,676,548 | 7/1928 | Gustafson | 172—786 |

ROBERT E. PULFREY, Primary Examiner

S. C. PELLEGRINO, Assistant Examiner

U.S. Cl. X.R.

172—430, 791, 796